United States Patent

[11] 3,555,201

[72] Inventors Manfred R. Kuehnle
Lexington;
Jurgen Kok, Bedford, Mass.

[21] Appl. No. 716,520
[22] Filed Mar. 27, 1968
[45] Patented Jan. 12, 1971
[73] Assignee DASA Corporation
Andover, Mass.
a corporation of Massachusetts

[54] ELECTRONIC REPERTORY DIALER
11 Claims, 9 Drawing Figs.

[52] U.S. Cl. .......... 179/90, 340/345, 340/359
[51] Int. Cl. .......... H04m 1/45
[50] Field of Search .......... 179/90B, 90BD, 5, 90CI; 340/345, 359

[56] References Cited

UNITED STATES PATENTS

| | | | |
|---|---|---|---|
| 3,035,250 | 5/1962 | Durkee | 340/171 |
| 2,768,238 | 10/1956 | Risinger | 179/5 |
| 1,960,129 | 5/1934 | Tchoubritch | 179/90 |
| 3,441,685 | 4/1969 | Wallace | 179/90 |
| 3,341,666 | 9/1967 | Wallace | 179/90 |

FOREIGN PATENTS

| | | | |
|---|---|---|---|
| 490,325 | 8/1938 | Great Britain | 179/90 |
| 469,464 | 11/1935 | Great Britain | 179/90 |

*Primary Examiner*—Kathleen H. Claffy
*Assistant Examiner*—Tom D'Amico
*Attorneys*—Joseph Weingarten and Philip J. Mc Farland

ABSTRACT: A repertory dialer for automatically dialing any one of a stored group of telephone numbers. The numbers are stored by an array of mechanically alterable switches, and a number to be called is selected and dialed by logic circuitry associated with the array of switches.

INVENTORS
MANFRED R. KUEHNLE
JURGEN KOK
BY

ATTORNEYS

INVENTORS
MANFRED R. KUEHNLE
JURGEN KOK
BY Joseph Weingarten
Stanley M. Schurgin
ATTORNEYS INVENTORS
MANFRED R. KUEHNLE
JURGEN KOK
BY Joseph Weingarten
Stanley M. Schurgin
ATTORNEYS INVENTORS
MANFRED R. KUEHNLE
JURGEN KOK
BY Joseph Weingarten
Stanley M. Schurgin
ATTORNEYS

ELECTRONIC REPERTORY DIALER

FIELD OF THE INVENTION

This invention relates to repertory dialing systems and more particularly to repertory dialers wherein automatic dialing is accomplished by electronic circuitry.

BACKGROUND OF THE INVENTION

Several types of repertory dialing systems are known wherein a plurality of telephone numbers can be prerecorded and, upon manual selection, a particular number is transmitted over a telephone line to a central station for subsequent dialing of a called station. One well-known repertory dialer employs a magnetic tape mounted for forward and backward motion by a suitable transport mechanism. Magnetic signals are recorded across the width of the magnetic tape to represent each stored telephone number. To dial a particular number, the tape is moved to an index position where the stored number is in registration with a transducing head which scans across the width of the tape to decode the data content thereof and cause dialing information to be transmitted to a called station. In another known telephone dialer, information is stored in the form of perforations on cards which can be selectively inserted into a card-reading mechanism to dial the number encoded on the card. Such telephone dialers are capable of storing hundreds and sometimes thousands of telephone messages, and are rather sophisticated devices which must be maintained carefully to assure proper working condition. By reason of their complexity and sophistication, these dialers are rather expensive, and for many purposes are too elaborate, as for example in a residence where only a few regularly called numbers need be stored. For such purposes, it would be desirable to have a simple repertory dialing system which is adapted to efficiently store a relatively small repertoire of telephone numbers. It is, therefore, an object of the present invention to provide a simple and relatively inexpensive dialer which can store a group of telephone numbers and which performs automatic dialing in an all electronic manner.

SUMMARY OF THE INVENTION

In accordance with the present invention, a mechanically alterable memory is employed to store data representing a plurality of telephone numbers. In a typical embodiment, the mechanically alterable memory can be a group of suitably interwired switches, each switch being used to encode one digit of a telephone number. In this manner, a telephone number can be stored by predetermined switch settings and a particular telephone number can be read out by appropriately selecting the switches containing the stored number. Once a predetermined number is selected, the digits of the number are sequentially read out of the memory to produce a sequential series of output signals representative of the selected number. The output signals may be of the well-known telephone pulse form or of the similarly well-known multitone format such as in "Touch-Tone" dialing employed by the Bell Telephone System.

In a typical embodiment, each telephone number is stored in a respective module containing a plurality of rotary switches, one for each digit of a telephone number. Each switch in the module is manually set to the position corresponding to the particular digit it represents in the stored number. Appropriate logic circuitry is connected to each of the switches of the plurality of modules. To dial a particular number, a pushbutton or other suitable actuation means representing the selected number is closed, this switch closure being operative to select the switch module representing that number. The digits of the selected number are strobed sequentially by the associated logic circuitry to generate a signal train representative of the selected number. This signal train is operative to energize a telephone number signal generator which provides signals of a form compatible with conventional dialing systems.

DESCRIPTION OF THE DRAWINGS

The invention will be more fully understood from the following detailed description, taken in conjunction with the accompanying drawings, wherein.

DETAILED DESCRIPTION OF THE INVENTION

Figure 1:
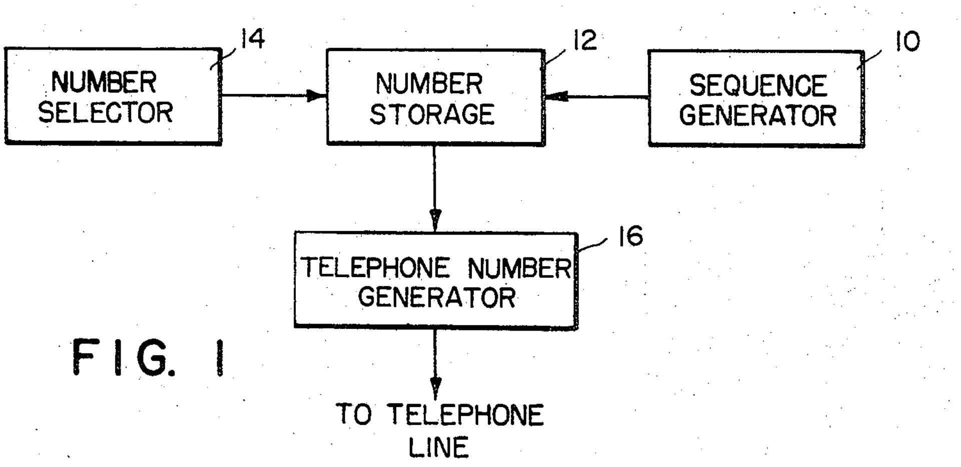
FIG. 1 is a block diagram of a repertory dialer according to the invention.

The dialing system embodying the invention is illustrated in FIG. 1 and comprises a sequence generator 10 connected to a number storage unit 12, which is also connected to a number selector 14. Number storage unit 12 has its output connected to a telephone number generator 16, the output of which can be connected to a telephone line. To dial a number stored in memory unit 12, the selected number is addressed by suitable actuation of number selector 14, and the selected number is sequentially read out of the memory under the control of sequence generator 10 to sequentially activate telephone number generator 16 to produce a plurality of signals, each corresponding to a digit of the selected telephone number. These signals are of the pulse type or of the dual tone-type compatible with conventional telephone dialing systems, and these signals are transmitted over the telephone line to a central station which is operative to dial the called station.

Figure 2:
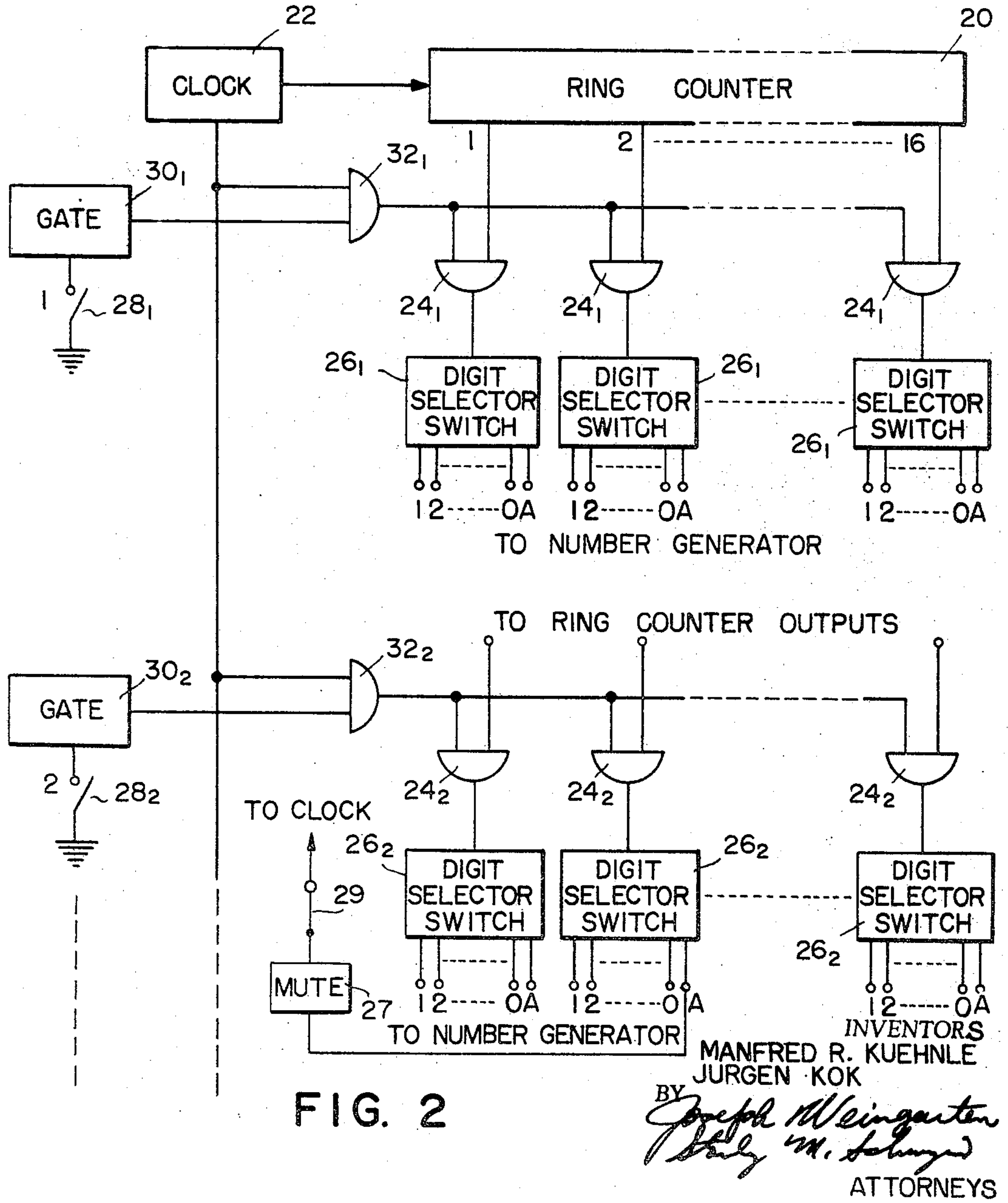
FIG. 2 is a schematic representation of a dialer according to the invention.

The number storage, number selection and sequence generation are implemented in the manner shown in FIG. 2. A multistage ring counter 20 is energized by a clock 22 which is operative to sequentially activate each flip-flop stage of the counter. In the illustrated embodiment, there are sixteen stages in the ring counter since this embodiment is designed to accommodate up to sixteen digit telephone numbers. Each stage of the ring counter is connected to a plurality of output gates 24 which are respectively connected to digit selector switches 26 which, in turn, are connected to number generator 16.

More particularly, each recorded telephone number is represented by a push button, or other manually operable selector switch 28, connected to a gate 30 which is connected through an AND gate 32 to a plurality of output gates 24, each connected to a successive stage of the ring counter. The output line of each respective output gate 24 is connected to the movable contact of its associated selector switches, and the stationary contacts of the selector switches are connected to the number generator 16. When a number selector switch 30 representing a particular recorded number is closed, the AND gate 32 associated with that switch is enabled and the output gates 24 are sequentially activated by timing pulses from clock 22. Each sequentially activated output gate 24 directs a signal to its associated digit selector switch, each being manually set to a position corresponding to a digit of the recorded number. Thus, a signal is directed by the digit selector switch to a digit line of the number generator operative to energize the requisite signal representing that particular digit.

In FIG. 2, the circuitry is shown for storing two telephone numbers, it being understood that additional numbers are stored similarly. The circuitry for the first number, designated "1" in the drawing, comprises a manually operable switch $28_1$ connected to a gate $30_1$ which is connected to one input of an AND gate $32_1$. The second input to the AND gate $32_1$ is from clock 22. The output of AND gate $32_1$ is connected to one input of a plurality of output gates $24_1$, the second input of each of these output gates being connected to respective outputs of ring counter 20. The output of each output gate $24_1$ is connected to the movable contact of a respective multiposition switch $26_1$, the output switch positions being connected to number generator 16.

The second number is implemented in a similar manner, the circuitry for number "2" being designated with subnumeral 2 to distinguish it from the circuitry associated with number "1." Other stored numbers are also implemented in like manner.

The digit selector switches here illustrated accommodate the digits 1 through 0 for dialing and, additionally, an ancillary position, denoted A, for purposes such as access or area coding, and an OFF position. Of course, the number of switch outputs can be varied, as desired, to suit particular operating requirements.

Figure 3:
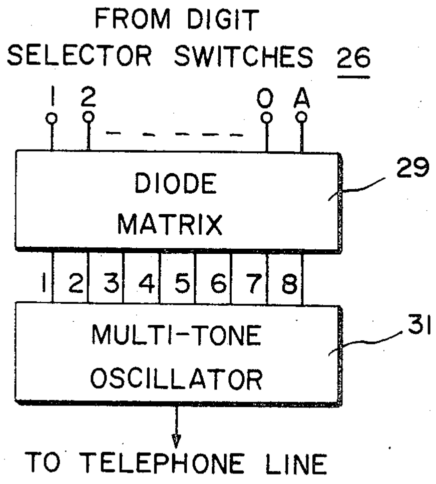
FIGS. 3 and 4 are schematic representations of the number generator of FIG. 1.
Figure 4:
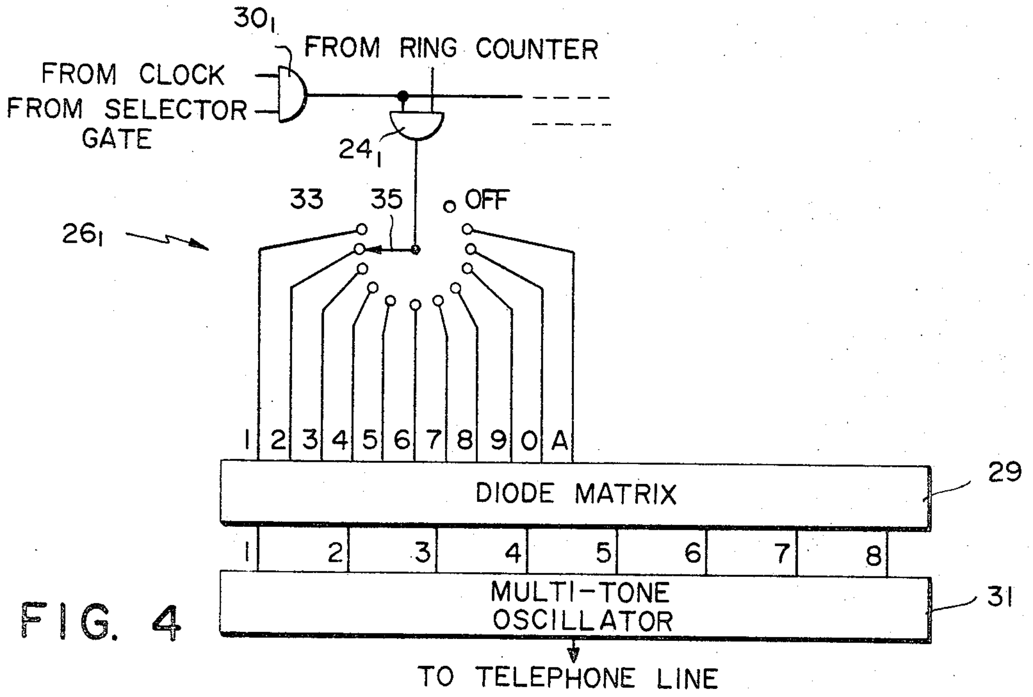
Figure 5:
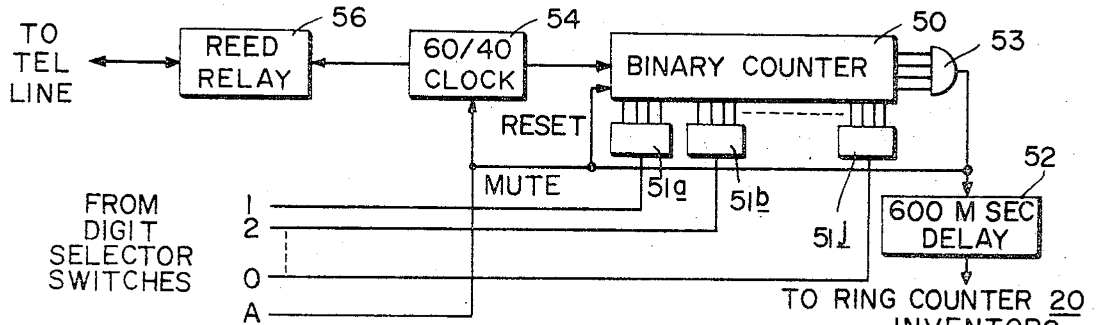
FIG. 5 is a schematic representation of another embodiment of the number generator.

The telephone number generator 16 is shown in greater detail in FIGS. 3, 4 and 5. FIGS. 3 and 4 show a multitone number generator, while FIG. 5 shows a pulse generator. Referring to FIG. 3, each of the digit selector switches 26 for each stored number are connected to a diode matrix 29 which has eight outputs connected to a multitone oscillator 31, the output of which is connected to a telephone line. Multitone oscillator 31 is well known in the telephone art and need not be discussed at length herein. In brief, the oscillator contains eight tuned circuits which can be selectively energized to provide output tones comprised of any two frequencies out of the eight possible frequencies. Thus, a plurality of dual frequency tones is produced, each of which is representative of a telephone digit. The diode matrix 29 is operative to energize selected pairs of its output lines in response to each of the input lines energized by way of the rotary switches. Each digit, selected by a properly set digit selector switch, thereby causes generation of a dual frequency tone representing that digit.

The interconnection of the digit selector switches to the matrix is shown in further detail in FIG. 4 wherein, for purposes of illustration, a single rotary switch $26_1$ is shown connected to diode matrix 29. The slidable contact 35 of the rotary switch is connected to output gate $24_1$ which receives its energizing signals from the ring counter and from the selector gate and system clock, as seen in FIG. 2. The eleven stationary contacts of the rotary switch are connected to respective input lines of the diode matrix. Ten of these lines represent the ten digits, while the eleventh lines, designated A, represents an ancillary position useful for example for access or area coding, as will be discussed hereinafter. Each of the other digit selector switches in the system is similarly connected to the matrix. The matrix is operative to energize selected pairs of its output terminals in response to each energized input line. Thus, a particular setting of each digit selector switch is operative to direct an energizing signal to matrix 29 which transforms this signal into a corresponding pair of energizing signals operative to cause oscillator 31 to generate a dual frequency tone representative of the stored digit. This dual frequency tone is compatible with the telephone central station equipment which acts in response to that tone to dial the called station.

Alternatively, telephone numbers can be dialed by the present system in a pulse format rather than a multiple tone format. In this instance, as depicted in FIG. 5, the number generator comprises pulse generation circuitry operative to produce trains of pulses representing each corresponding digit of a stored telephone number. Referring to FIG. 5, there is shown a binary counter 50, a plurality of preset gates 51*a* through 51*j*, and a stop gate 53, a 600 millisecond delay 52, a clock 54 and a reed relay 56. Preset gates 51*a* through 51*j* are each connected to respective terminals 1 through 0 of digit selector switches 26. Stop gate 53 is connected to the input of delay 52, the output of which is applied to ring counter 20. Gate 53 is also connected to the reset input of counter 50 and to a muting terminal of clock 54.

The binary counter 50 typically comprises four flip-flops interconnected to provide four output signals which represent four bit binary numbers. The binary numbers are of increasing binary value with successive clock pulses. Each preset gate 51*a* —51*j* is operative to set counter 50 to a predetermined count from which the counter will cycle in response to clock 54 back to a reset condition, that is, a binary count of 0 0 0 0, at which time clock 54 is placed in a standby state.

The table below shows the binary count preset into counter 50 by each respective signal from the digit selector switches 26, each of the signals representing a digit of a telephone number.

| Digit | Gate | Binary count | | | |
|---|---|---|---|---|---|
| 1 | 51a | 1 | 1 | 1 | 1 |
| 2 | 51b | 0 | 1 | 1 | 1 |
| 3 | 51c | 1 | 0 | 1 | 1 |
| 4 | 51d | 0 | 0 | 1 | 1 |
| 5 | 51e | 1 | 1 | 0 | 1 |
| 6 | 51f | 0 | 1 | 0 | 1 |
| 7 | 51g | 1 | 0 | 0 | 1 |
| 8 | 51h | 0 | 0 | 0 | 1 |
| 9 | 51i | 1 | 1 | 1 | 0 |
| 0 | 51j | 0 | 1 | 1 | 0 |

In operation, a sequence of digits from selector switches 26 is applied to corresponding gates 51*a*—51*j* to cause counter 50 to allow clock 54 to produce pulse trains representative of the digits of the number to be dialed. Each preset counter condition is chosen to provide the requisite number of clock cycles necessary to dial a particular digit. For example, when input gate 51*a* is energized by a signal on input line 1, the counter is set to binary number 1 1 1 1 and cycles through one counting operation to count 0 0 0 0, at which time stop gate 53 provides a signal which stops clock 54. Thus, clock 54 generates one pulse period, causing reed relay 56 to open and close once, thereby transmitting a "one" pulse over the telephone line to a called station. Clock 54 generates the conventional 60/40 telephone pulse format; that is, a pulse having a duration of 60 milliseconds and a rest period of 40 milliseconds before generation of the next pulse. The delay 52 provides the necessary 600 millisecond interdigital time required for proper telephone central station operation. More particularly, the signal from gate 53, after the 600 millisecond delay, is applied to ring counter 20 to allow generation of the next sequence step.

The operation of the system will now be described to dial the stored number 1. Selector-switch $28_1$ is closed thereby actuating gate $30_1$ which applies and enabling signal to AND gate $32_1$. Clock pulses from clock 22 are also applied to AND gate $32_1$, thus, the AND gate applies an enabling signal to each of the output gates $24_1$. The ring counter 20, energized by the clock pulses from clock 22, sequentially energizes its outputs 1 through 16 thereby applying signals sequentially to the output gates $24_1$ associated with each counter output. Each output gate is, therefore, sequentially activated to apply a signal to respective switches $26_1$.

Each switch is preset to a position representing a digit of a predetermined telephone number. The sixteen switches illustrated allow the storage of a conventional seven-digit number along with area and access codes. Of course, if area or access codes are not needed in a particular instance, the additional switches associated with these digits can be disabled, via the OFF switch position, or eliminated. The outputs of each switch are connected to the telephone number generator which provides the tones or pulses representing each digit of the number being dialed.

To alter a stored number, it is merely necessary to reset the switches $26_1$ to settings representing the digits of a new number. Actuation of the selector switch $28_1$ will now cause automatic dialing of the newly stored number.

The use of the "A" switch position for access coding is shown in FIG. 2 wherein a muting circuit 27 has its input connected to terminal A of the digit selector switch $26_2$ associated with the second output of ring counter 20. The output of muting circuit 27 is connected through a normally closed switch 29 to clock 22, and this muting circuit is operative to mute clock 22 when a signal appears on line A of the switch connected thereto. Opening of switch 29 allows clock 22 to again commence its operation.

This arrangement is useful, for example, in reaching an outside telephone line from a telephone in a private branch exchange. In a conventional telephone system, to dial a number on an outside line it is common to dial a given code number, say 9, to effect connection to the outside line and then upon receipt of a dial tone, to continue dialing the intended number. In the present automatic dialer, such accessing to an outside line is accomplished as follows. It is assumed that switch $26_2$ of the first output of counter 20 is set to its 9 position, the next switch is set to the A position and the next succeeding seven switches are set to the digits of a predetermined number. When number selector switch 2 is closed, the counter activates the first digit selector switch $26_2$ to cause the number 9 to be dialed. The counter now advances to its second count to activate the second digit selector switch $26_2$, which is set to its A position, to cause muting circuit 27 to stop clock 22. No further operation will continue until the clock is restarted by opening switch 29. When a dial tone is audibly received by a user of the dialer, the switch 29 is opened, causing clock 22 to commence operation and allowing counter 20 to continue its sequential activation of digit selector switches $26_2$ to dial the intended number. Thus, the A position of the digit selector switch 26 connected to the muting circuitry as shown, stops the counter at the position associated with the A switch, and allows the counter to continue counting after the muting signal is removed.

Figures 6, 8:
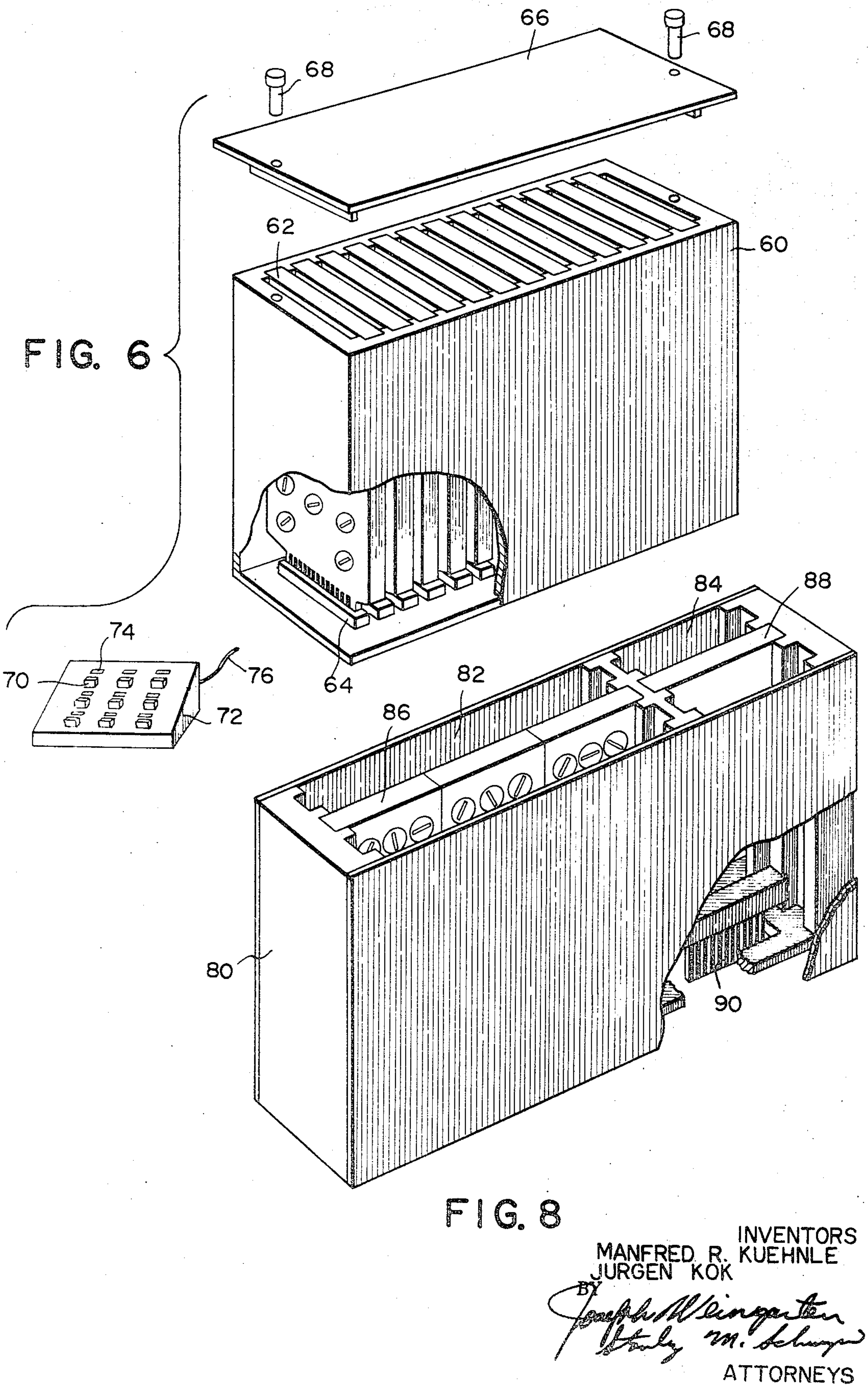
FIG. 6 is a partially cutaway pictorial view of a typical packaging configuration for the present invention.
FIG. 8 is a partially cutaway pictorial view of an alternative packaging arrangement for the present invention.

The present dialer is easily packaged in a compact housing which can be placed in an unobtrusive location. The number selector switches are housed in a small console which can be placed near a telephone instrument with which the dialer is used. Two typical packaging configurations are illustrated in FIGS. 6 and 8. Each of the illustrated packages is designed to contain nine stored numbers, together with the associated logic circuitry for selecting each of these numbers. Referring to FIG. 6, there is shown a rectangular housing 60 having a plurality of opposing slots formed in opposite sidewalls of the housing. A plurality of circuit boards 62 are disposed in respective slots, the circuit boards having edge connectors on the bottom edge thereof which mate with corresponding connectors 64 attached to the bottom of housing 60. Each number is stored on its own circuit card 62 and, in the nine number dialer illustrated, the nine leftmost cards contain the stored numbers, while the remaining four circuit cards contain the logic circuitry for operating the dialer. Each number storage card contains 16 rotary switches mounted thereon, some of these switches being visible in FIG. 6. The switches can be encapsulated within the circuit board, with all wiring from the switches to the terminals of the board being accomplished by well-known etched circuit techniques. Once the cards are inserted in housing 60, the package can be sealed from dust and other contaminants by a suitable cover 66 which can be fastened to housing 60 for example via machine screws 68. The number selector includes nine pushbuttons 70 mounted in a housing 72 which may be fabricated, for example, of a suitable plastic material. The housing 72 can be made with a sloping top panel to render the pushbuttons more visible to a user. The individual buttons are suitably numbered and each button is associated with a name tag 74 which indicates the name or number which is stored in the system. The number selector is connected to the dialing system by means of an interconnecting cable 76.

Figure 7:
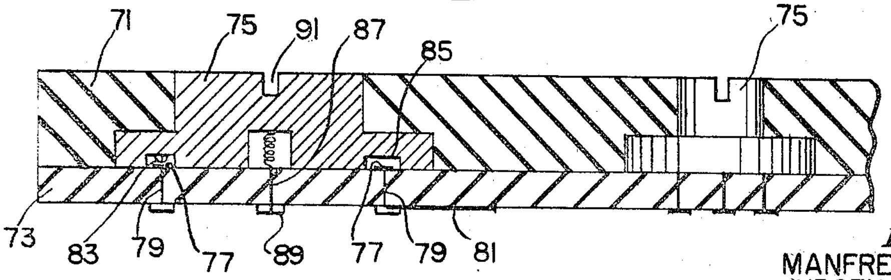
FIG. 7 is a partially cutaway elevation view of a rotary switch packaged according to the invention.

A rotary switch of a type which is contained within the circuit board is illustrated in FIG. 7. A rotor 75, typically formed of a suitable metal, is mounted for rotation in an opening provided in insulative circuit board 71. A second insulative board 73 is bonded or otherwise affixed to board 71 and contains a plurality of contacts 77 arranged in a regularly spaced circumferential pattern on the inner surface of board 71. These contacts can be formed, for example, by well-known etched wiring techniques, and are connected via leads 79 passing through board 73 to conductive paths 81 on the outer surface of board 73 which are, in turn, connected in circuit as required. Movable connection is made to contacts 77 by means of a wiper 83 located in an annular recess 85 provided in rotor 75. The common switch connection is made by a spring secured between rotor 75 and a lead wire 87, which is connected to a conductive path 89 which is part of the intended circuit. This spring also serves to provide good electrical connection between contacts 77 and wiper 83. The rotor can be turned by a screwdriver or other suitable tool which can be inserted in a notch 91 provided in the top of rotor 75. Of course, as an alternative construction, the conductive paths connecting the switch to the associated circuitry can be formed on the inner surface of board 73, thereby providing a completely enclosed circuit. Other rotary switches on the board are implemented similarly.

In FIG. 8 there is illustrated an alternative packaging configuration for the present dialer. This embodiment comprises a rectangular housing 80 having a first partitioned area 82 and a second partitioned area 84. The area 82 is designed to accommodate three number storage boards 86 while area 84 is designed to accommodate three circuit boards 88 containing the system logic circuitry. Each of the number storage boards 86 contains three stored numbers, the numbers being programmable by means of rotary switches as described hereinabove. The number storage boards and the circuit boards terminate in appropriate edge connectors 90 to interconnect the system with necessary power and control apparatus.

Figure 9:
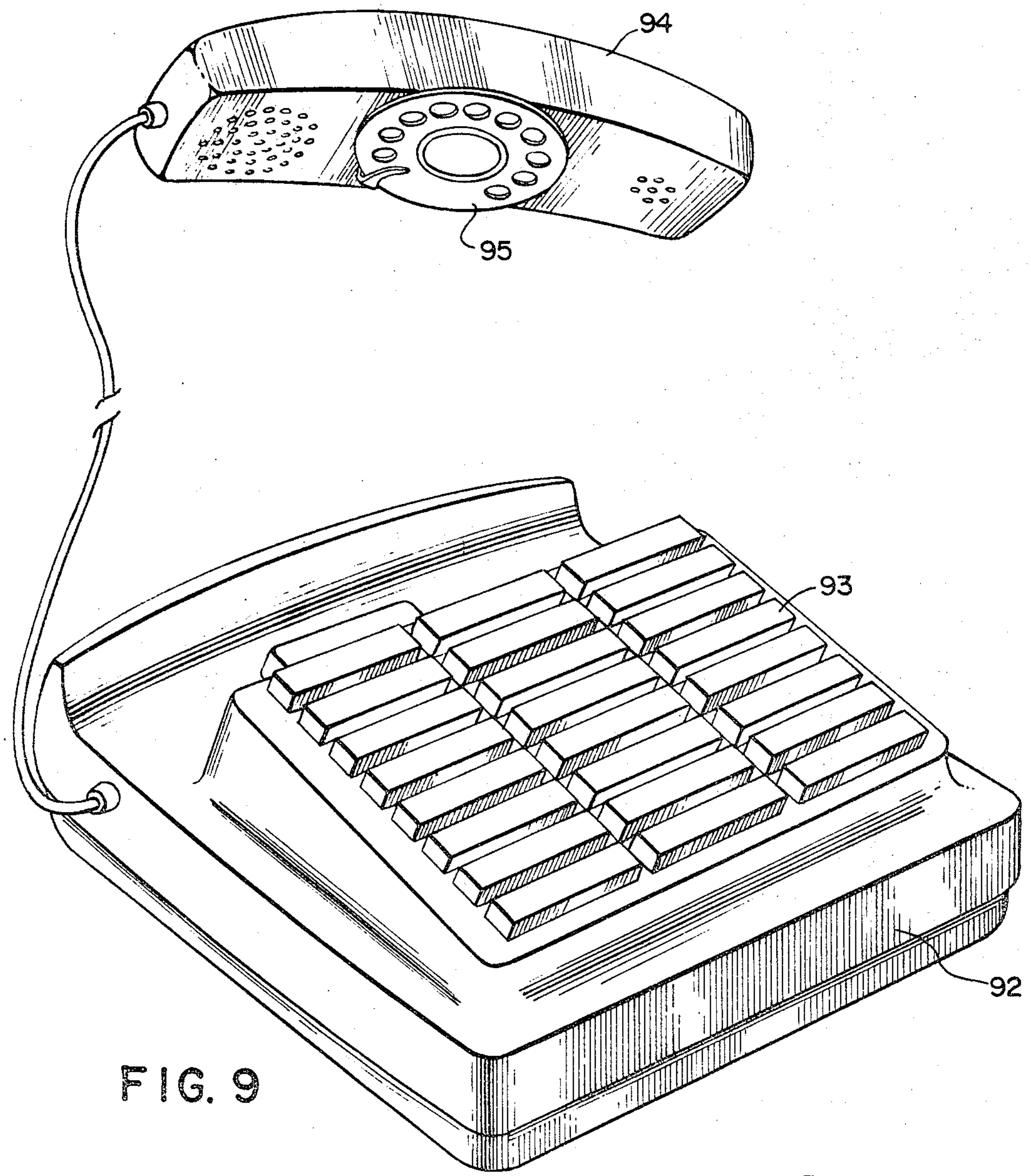
FIG. 9 is a pictorial view of the present invention housed in a telephone set.

FIG. 9 shows a dialer packaged in a telephone set which includes a housing 92 having a plurality of pushbuttons 93 on the sloping front panel thereof, and a handset 94 with a dial 95 mounted in the handset between the transmitter and receiver. The buttons 93 are the number selector switches for choosing a particular number to be dialed, and these buttons can be of sufficient size to carry the name or number represented by each button. The circuitry for storing and generating the number data can be contained within a separate housing, as in FIGS. 6 and 8, or this circuitry can be packaged within housing 92, especially if modern microcircuits are employed.

From the foregoing, it is evident that a compact and relatively uncomplicated telephone dialer has been provided in which automatic dialing is accomplished in an all electronic manner. Once a number is programmed by means of the multiposition switches, the dialing operation is accomplished electronically by the logic circuitry.

The invention is not to be limited to what has been particularly shown and described, except as indicated in the appended claims.

We claim:

1. A repertory dialer comprising:

a plurality of mechanically alterable digit selector switches arranged in groups, each group representing a stored telephone number, and each selector switch representing one digit of a stored number;

counting means including a ring counter operative to provide at its output a plurality of time sequential signals;

gating means operative to connect a selected group of digit selector switches to the output of said counting means thereby to sequentially energize the digit selector switches in said selected group to provide a series of signals representing a predetermined number;

a number generator operative to convert the series of signals from said selected group of digit selector switches to a form adapted to call the predetermined number; and said gating means including:

a plurality of AND gates each connecting each one of said digit selector switches to respective outputs of said ring counter; and a plurality of manually actuable number selector switches, each connected to selected ones of said AND gates and operative to couple said sequential sequence of output signals to a selected group of digit selector switches.

2. A repertory dialer according to claim 1 wherein said number generator includes:

a binary counter;

a plurality of counter preset gates each connecting a respective one of the digits of said digit switches to said counter and each operative to preset said counter to a binary number representative of the corresponding digit of said digit switches;

clock means for generating 60/40 telephone pulses corresponding to the numbers preset in said counter thereby to provide telephone dialing pulses adapted to be transmitted over a telephone line; and means coupled to said binary counter and said ring counter for providing a predetermined interdigital time delay between telephone pulses.

3. A repertory dialer comprising:

a plurality of mechanically alterable digit selector switches arranged in groups, each group representing a stored telephone number, and each selector switch representing one digit of a stored number;

counting means operative to provide at its output a plurality of time sequential signals;

gating means operative to connect a selected group of digit selector switches to the output of said counting means thereby to sequentially energize the digit selector switches in said selected group to provide a series of signals representing a predetermined number;

a number generator operative to convert the series of signals from said selected group of digit selector switches to a form adapted to call the predetermined number; and muting means connected between one of said digit selector switches and said counting means and operative to stop the operation of said counting means when said one of said digit selector switches is energized and set to a predetermined position.

4. A repertory dialer according to claim 3 wherein said muting means includes a manually operable switch for restarting operation of said counting means.

5. A repertory dialer according to claim 1 wherein said number generator includes a multitone oscillator and an input matrix and is operative to generate selected dual-frequency signals in response to signals from said selected group of switches.

6. A repertory dialer according to claim 1 wherein said number generator includes pulse generation circuitry operative in response to signals from said selected group of switches to produce telephone system compatible pulses to call the predetermined number.

7. A repertory dialer according to claim 1 wherein said counting means includes clock means coupled to said ring counter and to said gating means and operative in response to actuation of a number selector switch to control operation of said ring counter.

8. A repertory dialer according to claim 1 wherein each of said digit selector switches comprises a multiposition switch having a moveable contact and a plurality of stationary contacts, said moveable contact being connected to a respective one of said AND gates, and said stationary contacts being connected to said number generator.

9. A repertory dialer according to claim 1 wherein each group of digit selector switches is disposed in a respective module removably contained within a common housing.

10. A repertory dialer according to claim 8 wherein a group of multiposition switches representing a stored number are housed in a circuit board which contains etched connections to the associated circuitry.

11. A repertory dialer according to claim 10 wherein each of said multiposition switches is a rotary switch having a rotor disposed for rotation within said circuit board, said movable contact being attached to said rotor and adapted to selectively contact said stationary contacts on said circuit board.